United States Patent
Godwin et al.

[15] 3,643,753
[45] Feb. 22, 1972

[54] ELECTRICAL FILTERS FOR WEIGHING SYSTEM CIRCUITS

[72] Inventors: Gilbert A. Godwin, Oakland, N.J.; Anthony T. Kirkman, Ravenshead, Nottingham, England

[73] Assignee: Howe Richardson Scale Company, Clifton, N.J.

[22] Filed: Sept. 3, 1969

[21] Appl. No.: 854,994

[52] U.S. Cl. ............................................ 177/185, 177/210
[51] Int. Cl. ............................... G01g 23/10, G01g 11/04
[58] Field of Search .................................. 177/185, 210, 211

[56] References Cited

UNITED STATES PATENTS

| | | | |
|---|---|---|---|
| 2,849,669 | 8/1958 | Kinkel | 177/211 X |
| 2,914,310 | 11/1959 | Bahrs | 177/210 |
| 3,042,128 | 7/1962 | Bell et al. | 177/210 |
| 3,113,631 | 12/1963 | Moulin et al. | 177/211 X |
| 3,172,493 | 3/1965 | VanKoch et al. | 177/210 |
| 3,209,846 | 10/1965 | Karlen | 177/211 |
| 3,288,231 | 11/1966 | Hanne | 177/210 |

*Primary Examiner*—Robert S. Ward, Jr.
*Attorney*—Norris & Bateman

[57] ABSTRACT

A weighing system comprising a transducer operatively connected to a load supporting structure for producing a DC analogue signal voltage having an amplitude which represents a weight condition of a load applied to the structure, at least one signal utilization device, and a circuit for transmitting the DC signal voltage to the signal utilization device and including an electrical filter for attenuating undulating voltage superimposed to the DC signal voltage. The filter includes an amplifier and is characterized by a variable impedance connected to the input of the amplifier for selectively varying the time response of the filter without altering the DC gain thereof. The damping coefficient of the filter is a function only of a preselected value of the percentage by which the filter output voltage initially overshoots its steady state value when the transducer voltage is applied as a step input to the filter.

15 Claims, 4 Drawing Figures

PATENTED FEB 22 1972 3,643,753

INVENTORS
GILBERT A. GODWIN
ANTHONY T. KIRKMAN

BY Norris & Bateman

ATTORNEYS

3,643,753

ELECTRICAL FILTERS FOR WEIGHING SYSTEM CIRCUITS

FIELD OF INVENTION

This invention relates to filters and particularly to electrical filters for weighing systems.

BACKGROUND OF INVENTION

In the scale industry it is common practice to make weight measurements by utilizing force transducers such as load cells and the like which are operatively connected to a scale to produce a DC analogue signal voltage that is representative of a weight condition of an applied load. In checkweighing systems, for example, the transducer signal voltage is applied to a signal utilization circuit for signalling the presence of acceptable weight, overweight and underweight loads. In batch weighing systems the transducer signal voltage is utilized to control the delivery of material to a weigh hopper for weighing out drafts of preselected weight.

For motion, batch weighing and other weighing applications it is especially desirable to make fast as well as accurate weight measurements. In checkweighers, for example, it is not uncommon to desire to check the weight of a load within ± one-half ounce in not more than one-half of a second. This invention is particularly concerned with such high-speed, sensitive weighing systems.

To preserve the accuracy of the weighing system it is important that the DC signal voltage, which represents the measured weight condition, be substantially free of any AC or other undulating voltage components when it is applied in the signal utilization circuit to perform a given operation. Such AC and other undulating, time base voltage components can distort the DC transducer output signal sufficiently to objectionably impair the overall accuracy of the weighing apparatus.

Since the undulating voltage components are mainly developed by mechanically unbalanced scale parts, vibrations in the vicinity of the scale, and AC pickup in the circuit of the weighing system, they usually are unavoidably superimposed on the DC transducer output signal. As a result, it is necessary to employ an electrical filter for attenuating the superimposed components if the accuracy of the weighing system is to be preserved. For service in a high-speed, accurate weighing system, however, an electrical filter must meet a number of exacting requirements. First it must have a very low-cutoff frequency (sometimes referred to as the natural or corner frequency) to provide optimum filtering or attenuation of the undesired voltage components. Second, it must have a very short time or step response to a step input function so that successive weight measurements can be made as rapidly as possible. The latter requirement is especially desirable in checkweighing and other motion or dynamic weighing applications.

The cutoff frequency, as defined herein, is the frequency at which the AC signal component begins to diminish at a predetermined rate or, in other words, begins to roll off at a rate which is usually expressed in decibels per octave. Normally, the cutoff frequency is that frequency at which the roll off decreases to a value equal to the lower limit of the allowable distortion within the pass band.

Prior filters, especially those that are commercially available, fail to fully meet the foregoing requirements for one reason or the other. Most are overdamped or critically damped with the result that the time response is so slow as to objectionably reduce the speed at which loads can successively be checked or weighed out. Shortening the step response of many previously proposed filters does not result in an optimum solution, for it usually increases the cutoff frequency objectionably. While overdamping and critical damping are normally not acceptable, excessive underdamping is also unsuitable because it increases the time response by overshooting an acceptable voltage tolerance or error band containing the final steady-state voltage level. An underdamped filter is one in which the output voltage will overshoot its steady-state value in response to a step input voltage. In a critically damped filter and an underdamped filter there will be no overshoot of the steady-state value when as step input voltage is applied.

SUMMARY OF INVENTION, OBJECTS AND DESCRIPTION OF DRAWINGS

In overcoming the foregoing shortcomings of prior filters, the present invention has as a major object a novel electrical filter wherein both the cutoff frequency and time response are optimized so that a short time response is attained without significantly sacrificing the filtering action of the circuit.

Another object of this invention is to provide a novel filter wherein the time or step response can be varied without altering the DC gain of the circuit. This is of practical importance because such a change in the proportion of the transducer-produced analogue signal voltage to the measured weight condition would require a corresponding change in scaling factors for preset signal voltages which are electrically compared with the transducer signal in utilization circuits for checkweighing, batch weighing, motion weighing, and other weighing systems. In the filter of this invention the problem of changing scaling factors is avoided by maintaining the gain at a constant value even though the time response is varied.

In accordance with this invention it was found by the inventors that the time response of a filter having a predetermined transfer function could be controlled by controlling the damping coefficient or damping ratio of the filter. The factor designated by either of these terms is the same as the factor defined as the damping ratio in pages 1–12 of the Lighting Empericist, vol. 13, Nos. 3 and 4 July–Oct. 1965). The damping coefficient indicates the extent to which the transient response of the filter circuit is attenuated.

According to this invention the values of certain filter circuit components are derived from a preselected damping coefficient value so as to provide the filter circuit with essentially the shortest time response to a step input signal that is available when the filtering action is sufficient to maintain the filter output within a preselected tolerance band. To achieve these results, the preselected damping coefficient value is calculated in such a manner that it will be a function only of the selected tolerance band. In the weighing art the term "tolerance" means plus or minus a predetermined deviation from a true or desired value. Hence the "tolerance band" is the range of tolerance values between maximum positive and negative tolerance values.

In a preferred embodiment of this invention, the transducer output signal is applied to one terminal of an input circuit branch, the other terminal of which is connected to the inverting input terminal of an amplifier. The other input terminal of the amplifier is connected to a source of reference potential. The input circuit branch is made up only of resistors to provide a nonreactive current path to the inverting amplifier terminal. A negative, nonreactive feedback loop is connected between the amplifier output and a junction in the input circuit branch. There is at least one resistance element common with both the input circuit branch and the nonreactive feedback loop. A second feedback loop is connected between the amplifier output and the inverting amplifier input terminal to pass only AC components through a reactive path. Another reactive path passing only AC components is connected between the reference potential source and the junction to which the nonreactive feedback loop is connected in the input circuit branch.

According to a further aspect of this invention the value of that resistance, which is common to both the input circuit branch and the nonreactive feedback loop, may be varied to control the time response of the filter circuit to a step input function without varying the DC gain of the circuit. As a result, the time response of the filter circuit can be adjusted within the tolerance band to closely match the rate at which the scale in the weighing system is capable of measuring weight conditions of successively applied loads.

DETAILED DESCRIPTION

In the preferred embodiment the electrical filter of this invention will be described as it is employed in a checkweighing system. It will be appreciated, however, that the electrical filter of this invention has numerous other applications as in, for example, batch-weighing systems, motion-weighing systems in general, and particularly vehicle or other article-weighing systems wherein the impact and/or motion of the load on the weighing machine produces vibrations which are superimposed in the form of undulating components upon the true static weight signal.

Figure 1:
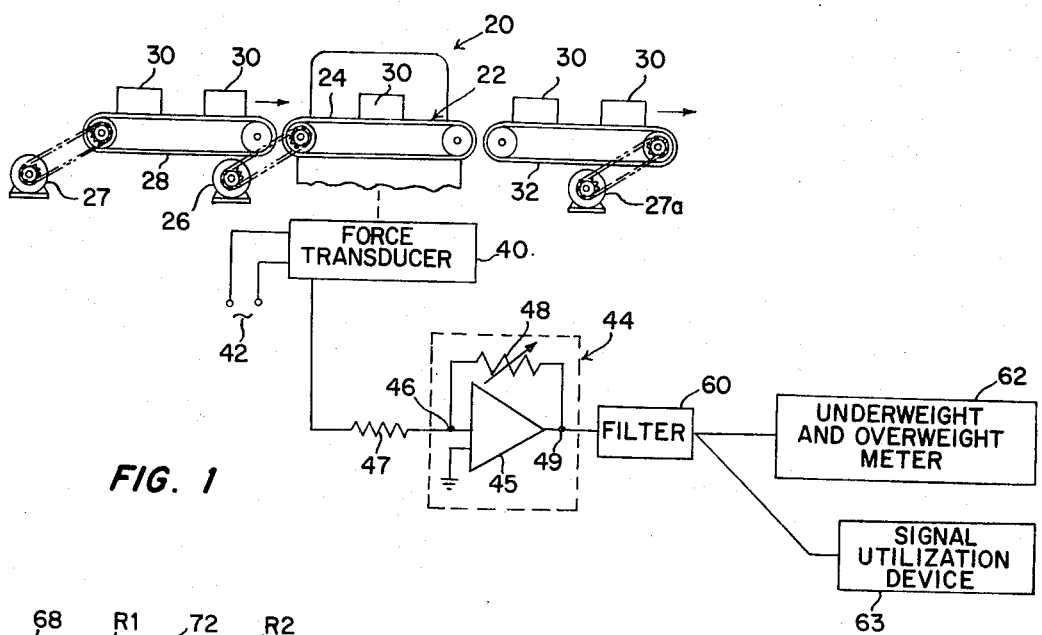
FIG. 1 is a diagrammatic view showing a preferred embodiment of the electrical filter of this invention as it is incorporated into a checkweighing system.

Referring now to the drawings and more particularly to FIG. 1, a checkweigher incorporating the filter of this invention is generally indicated at 20 and comprises a scale having a load-receiving platform 22. Platform 22 comprises a conventional conveyor 24 which is driven by a motor 26. Loads to be checkweighed are successively advanced to checkweigher 20 by a suitable motor driven conveyor 28. These loads, for example, may be drafts of material which are discharged from an unshown batch weigher and which may be packaged in bags, cartons, or other suitable containers indicated at 30. The loads are successively moved one at a time across platform 22. A suitable, motor driven discharge conveyor 32 removes the loads after they have been checkweighed. Conveyors 28 and 32 may be driven by motors 27 and 27a as shown. Checkweigher 20 classifies the drafts or loads as being within preselected, underweight, acceptable weight, or overweight ranges.

Still referring to FIG. 1, a force transducer 40 is operatively connected to platform 22 in any suitable, conventional manner and may comprise a DC to DC linear variable differential transformer excited by a suitable DC power supply source indicated at 42. Transducer 40 senses the weight of a load applied to platform 22 and converts the sensed weight into an analogue DC signal voltage For checkweighing, the magnitude of this transducer output signal is adjusted to have a zero value when the weight of the load being checkweighed equals a desired, acceptable weight and is thus neither overweight nor underweight.

Thus, when the weight of the load on platform 22 exactly equals the desired, preselected weight, transducer 40 will produce a null or zero voltage. When the load placed on platform 22 deviates in an underweight direction from the desired, preselected weight for which transducer 40 has been adjusted and when the magnitude of the deviation is within the range of the transducer, the force transducer output signal will be negative and its magnitude will be proportional to the weight by which the load on platform 22 deviates from the desired, preselected weight. Similarly, when the load on platform 22 deviates from the desired, preselected weight in an overweight direction and when the deviation is within the transducer range, the force transducer output signal will be positive and its magnitude will be proportional to the weight by which the load deviates from the desired, preselected weight.

The output of transducer 40 is connected to a signal conditioning amplifier circuit indicated at 44 in FIG. 1. Circuit 44 may be of any conventional, suitable form, but preferably is the same as that described in the pending U.S. application Ser. No. 658,229, filed on Aug. 3, 1967 now U.S. Pat. No. 3,528,518 for Automatic Batch Weigher and assigned to the assignee of this application and in Ser. No. 750,392 filed Aug. 5, 1968 now U.S. Pat. No. 3,550,704 for Automatic Batch and Checkweighing Apparatus and also assigned to the assignee herein.

With continued reference to FIG. 1, the amplified output signal of amplifier circuit 44 is transmitted through the filter of this invention to one or more signal utilization devices or circuits indicated at 62 and 63. The filter is generally indicated at 60 in FIG. 1 and is operative to attenuate AC and other undulating components that may have been superimposed upon the weight-representative, DC signal in a manner to be described in detail shortly. In this embodiment, device 62 may comprise an overunder meter of conventional form.

Device 63 may comprise a signal voltage comparator of any suitable type for comparing the amplified and filtered transducer output signal voltage with selectively fixed voltages to provide an indication of whether the load being checkweighed is in an acceptable weight range or deviates in either an overweight or underweight direction from the acceptable weight range. Examples of such comparator circuits are described in the aforesaid Ser. Nos. 658,229 and 750,392.

The undesired AC components damped out by filter 60 are generally referred to as noise emanating from such sources as mechanical vibration in the vicinity of the scale, mechanical unbalance of rotating and other mechanical elements forming a part of the scale, and AC pickup on conductors in the circuitry. In general, the undulating components attenuated by filter 60 will hereinafter be designated simply as AC components to cover true AC components as well as other undulating components which particularly have a time base.

Figure 2:
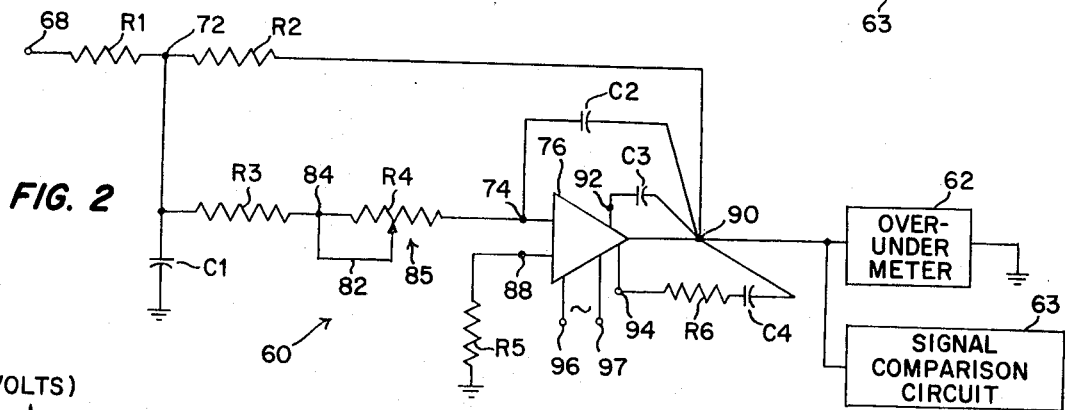
FIG. 2 schematically illustrates the circuitry of the electrical filter shown in FIG. 1.

Referring now to FIG. 2, filter 60 is provided with an input terminal 68 which is connected to the amplifier output terminal 49. Terminal 68 is connected through a resistor R1 to a junction indicated at 72.

Connected in series between junction 72 and an inverting signal input terminal 74 of an operational amplifier 76 is fixed resistor R3 and a potentiometer resistor R4. The potentiometer wiper indicated at 82 is connected to a common junction 84 between resistors R3 and R4. The potentiometer defined by wiper 82 and resistor R4 is generally indicated at 85.

Adjacent terminals of resistors R3 and R4 are connected to junction 84. The other terminal of resistor R4 is connected to terminal 74, and the other terminal of resistor R3 is connected to junction 72. Junction 72 is also connected through a capacitor C1 to ground. Capacitor C1 provides a current path for passing AC components between ground and junction 72. In particular, capacitor C1 provides a current path for bypassing high-frequency input signal components to ground and starts to have an effect as the input signal frequency approaches the cutoff or corner frequency of the filter so that as the input signal frequency approaches and exceeds the cutoff frequency, the AC components will increasingly be bypassed to ground. Cutoff frequency of the filter in this embodiment is about 2 cps.

The other input terminal of amplifier 76 is indicated at 88 and is connected through a resistor R5 to ground. Resistor R5 provides for temperature stabilization of filter 60 by presenting to the current flowing through terminal 98 essentially the same impedance as is presented to the current leaving amplifiers 76 through terminal 74.

As shown in FIG. 2, a resistor R2, which is connected between junction 72 and the amplifier output terminal indicated at 90, provides a nonreactive, negative feedback loop for passing both direct and alternating current components. It will be appreciated that the ratio of R2/R1 is equal to the DC gain of the amplifier circuit in filter 60.

A second amplifier feedback loop, which passes only alternating current through a reactive path, is provided by a capacitor Cz having its terminals respectively connected to input terminal 74 and output terminal 90. Terminal 90 is connected to the input terminals of signal utilization devices 62 and 63 as shown.

Capacitor C2 provides a high-frequency short circuit in the feedback, and the output voltage which is fed back by capacitor C2 will be out of phase with respect to the input voltage, thereby nullifying the effect of the high-frequency input voltage component. As the frequency of the input signal approaches and exceeds the cutoff frequency of the filter, the frequency of the voltage fed back by capacitor C2 will correspondingly increase. Thus, by algebraically summing this feedback voltage from capacitor C2 and the input signal voltage at the input of amplifier 76, the AC components in the input signal voltage and the feedback voltage will balance out to zero when the frequency of the feedback signal increases sufficiently.

Capacitors C3 and C4 and a resistor R6 minimize oscillations due to the feedback loops provided by resistor R2 and capacitor C2. Capacitor C3 is connected between terminal 90 and another operating terminal 92 of amplifier 76. Capacitor C4 and resistor R6 and connected in series between terminal 90 and a further operating terminal 94 of amplifier 76.

A source of AC operating power is applied across terminals 96 and 97 of amplifier 76.

With major exceptions of potentiometer 85 and the values of the electrical components as shown in FIG. 2, filter 60 is basically the same as that illustrated on p. 74 of the 1966 Burr-Brown Research Corporation handbook entitled "Operational Amplifier Active RC Networks."

When a load advanced on to platform 22 has a weight deviation in either an overweight or underweight direction from the preselected, acceptable weight for which transducer 40 has been adjusted, the output signal voltage of transducer and consequently the amplified signal applied to the filter input terminal 68 will be of step form. Assuming that AC components have been superimposed upon the DC signal voltage, the steady-state condition will not be constant but will be oscillating at a rate dependent on the time base of the AC components.

For frequencies essentially up to the cutoff frequency of filter 60, the AC components remain substantially unattenuated and unavoidably pass with the DC signal through resistors R1, R3, and R4 and through amplifier 76 to output terminal 90. However, the AC components having frequencies essentially equal to or greater than the cutoff frequency follow a less resistive, short-circuited path through capacitor C1 and also the amplifier closed loop gain provided by capacitor C2. As a result, the AC components diminish at the rate of about 40db. per decade from the cutoff frequency. Attenuation of the AC components is thereby effectively achieved without attenuating the DC analogue signal produced by transducer 40. The signal voltage at terminal 90 will have the waveform indicated at 101 in FIG. 3 and at 101a in FIG. 4. This filter output signal is referred to as the transient response to the step input signal or more simply as the step response. Waveform 99 illustrates an unfiltered response to a step input signal.

Figure 3:
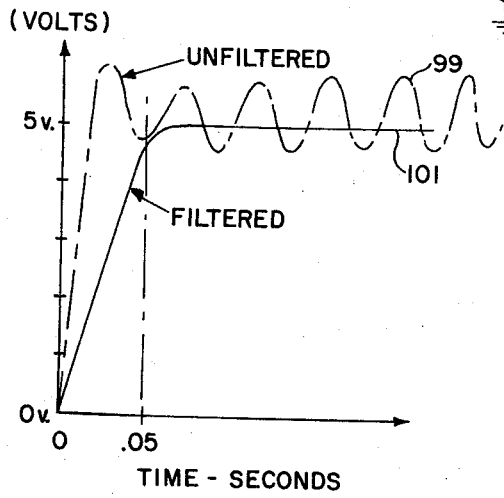
FIG. 3 illustrates a typical example of unfiltered signal as compared with the filtered signal which is derived from the filter shown in FIG. 2.
Figure 4:
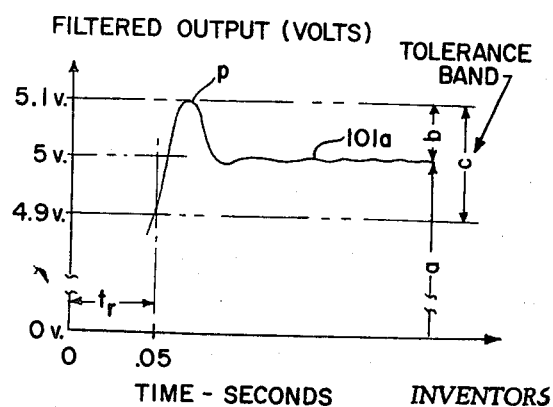
FIG. 4 is an enlargement of a portion of the filtered voltage curve shown in FIG. 3.

Owing to the inherent characteristics of filter 60, there will be a short time lag before the filter output signal reaches its steady state level which is shown in FIGS. 3 and 4 to be, by way of example, 5 volts. This lag is generally referred to as the time response of the filter. In the filter of this invention where the filter output signal voltage does not deviate from an acceptable, preselected tolerance band $c$ (FIG. 4) upon initially entering the tolerance band, the time response may be taken at time $t_r$ where the output voltage increases to a value equal to the minimum value of the selected tolerance band.

If the loads are successively advanced to positions where they are fully supported by platform 22 for intervals as small as one-half of a second, it is apparent that the time response cannot exceed one-half of a second. And unless filter 60 is capable of meeting this requirement at a low-cutoff frequency, the minimum fully supported weighing time must be increased even though the scale is capable of operating at a faster rate.

According to this invention it was observed by the inventors herein that the time response of filter 60 was dependent upon the value of the filter's damping coefficient owing to the transfer function of the filter. It was further recognized by the inventors herein that owing to the particular transfer function of filter 60, there was a determinable, optimum value of the damping coefficient that would provide filter 60 with the shortest time response to a step input function for each selected value of the filter's tolerance band (see FIG. 4). The tolerance band is that range of voltages which the filter output voltage remains within for all times equal to and greater than the time at which the filter output voltage first rises above the lower limit of the tolerance band.

Based upon the foregoing, the inventors herein found that the optimum value of the filter's damping coefficient ($D$) is determinable by the following algebraic expression owing to the particular transfer function of filter 60:

$$D = \sqrt{\frac{M^2}{\pi^2 + M^2}} \quad (1)$$

wherein $$M = Log_e N$$

The value of $N$ is equal to $Q/100$ wherein $Q$ is the percentage by which the filter output voltage initially overshoots its steady state value or more specifically $$N = \frac{\text{Voltage ``b''}}{\text{Voltage ``a''}} \div 100 \quad (2)$$

wherein voltage "$a$" represents the steady-state value of the filter's output voltage as shown in FIG. 4 and wherein voltage "$b$" represents that peak value by which the filter output initially overshoots the steady-state value "$a$."

In effect, therefore, $Q$ is the ratio of voltage "$b$"analyzing to voltage "$a$."

The foregoing algebraic expression (1) is derived from an expression used in analyzing mechanical servomechanism designs, but heretofore, it was not known to apply such an algebraic expression or any other form thereof for determining the damping coefficient of an electrical filter and more particularly for determining the values of filter components.

To obtain those values which when applied to the components of filter 60 will provide the optimum time response without objectionable sacrifice of filtering action, the steady-state value of the filter output voltage is first ascertained. This is determined by the value of the voltage that is applied as an input to filter 60 and the selected gain of filter 60. Then the upper and lower limits of the tolerance band, or more particularly the voltage difference "$c$" (FIG. 4) is selected. To achieve optimum results maximum initial overshoot voltage "$b$" is made equal to one half of voltage "$c$." From these values the values of $Q$ and then $N$ are determined followed by the calculation of the damping coefficient from the calculated value of $N$ using the previously mentioned algebraic expression for the damping coefficient. It should immediately be evident that by calculating the damping coefficient in this fashion, filter 60 will be underdamped.

Having the thusly calculated value of the damping coefficient a value for the cutoff frequency is selected, and from these values the time response is calculated. This calculated time response is then compared with the time $t_r$ (see FIG. 4) which is the time that the filter output waveform should intersect the lower limit of the selected tolerance band. If the calculated time response does not equal or closely approach time $t_r$, another value for the cutoff frequency is selected and the calculation process is repeated until that cutoff frequency value is found which will yield the time $t_r$.

Having the desired cutoff frequency ($f_o$) and selecting a value for capacitor C2 a constant ($K$) is then determined from the expression $$C2 = \frac{K}{2\pi f_o} \quad (3)$$

With the thusly calculated values of the constant $K$ and the damping coefficient ($D$) and with the selected value of the gain ($H$) of filter 60, the values of resistors R1 and R2 and the combined values of R3 and R4 are then determined from the following expressions $$R1 = \frac{D}{HK} \quad (4)$$

$$R2 = (H)(R1) \quad (5)$$

$$(R3+R4) = \frac{D}{(H+1)K} \quad (6)$$

From the last expression the values of R3 and R4 are chosen and the upper and lower limits of potentiometer 85 are selected to suit existing conditions. The value of capacitor C1 is determined by the expression $$C1 = \frac{2}{D^2}(H+1)\frac{K}{2\pi f_0} \quad (7)$$

Preferably the selected value of capacitor C2 is such that the real part of the pole of its time constant and the real part of the pole of the time constant for capacitor C1 are the same.

The values of the remaining components in filter 60 are selected by suitable methods.

By virtue of calculating the filter's damping coefficient from the previously defined expression $$\sqrt{\frac{M^2}{\pi^2 + M^2}}$$

it is apparent that the damping coefficient will have a value which is a function only of the percentage of overshoot ($Q$) and, consequently, only of the selected tolerance band (voltage "$c$"). It is further apparent that the thusly calculated value of the damping coefficient dictates the values of resistors R1, R2, R3, and R4.

By calculating the values of capacitors C1 and C2 and of resistors R1, R2, R3 and R4 in the foregoing manner, filter 60 will be underdamped and will yield the shortest time response for the selected tolerance band, and the filter output voltage waveform, upon entering the tolerance band at time $t_r$ will remain within the acceptable tolerance band. As shown in FIG. 4, the underdamped response of filter 60 overshoots the steady state value of the filter output voltage by rising to a peak $p$ whose value is equal to or at least very closely approaches the maximum value of the tolerance band $c$. The maximum value of tolerance band $c$ having been preselected, represents the upper limit of the permissible deviation from the true weight condition represented by voltage $a$. The minimum value of the tolerance band represents the lower limit of permissible deviation from voltage $a$. The filter response will be at its greatest at the first peak $p$.

Thus, both response time and filtering action of filter 60 are optimized to enable rapid and accurate weight measurements of successively applied loads.

In view of the previously defined algebraic expression for determining the combined values of resistors R3 and R4, it is clear that adjustment of potentiometer 85 will correspondingly alter the damping coefficient. Since the damping coefficient determines the time response as well as the magnitude of overshoot, the time response ($t_r$) and the overshoot (voltage "$b$") may selectively be varied by potentiometer 85 without altering the DC gain of filter 60. As a result, potentiometer 85 may selectively be adjusted to compensate for manufacturing tolerances that occur in standard purchased components that are used for making up the circuit for filter 60. Example, the values of the capacitors, owing to manufacturing imperfections, usually will vary considerably from the desired, calculated values that will provide filter 60 with the previously described optimum time response and filtering characteristics. Potentiometer 85 is therefore adjustable to compensate for the expected, inherent variations in component values and to thereby ensure that the overshoot of the filter output falls within the selected tolerance band.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a weighing system having means for supporting a load, means operatively connected to said load-supporting means for providing an analogue signal voltage having an amplitude that is a function of a weight condition of a load applied to said supporting means, signal utilization means, and means interconnecting said analogue signal voltage-providing means and said utilization means for applying said signal voltage to said signal utilization means and comprising an electrical multiple pole filter circuit for attenuating undulating voltages superimposed on said signal voltage, the improvement comprising means forming a part of said circuit for varying the time response of said circuit to the application of said signal voltage to said circuit without altering the DC gain thereof.

2. The weighing system defined in claim 1 wherein said circuit comprises an amplifier having an output electrically connected to said signal utilization means, and wherein said time-response varying means comprises impedance means having a selectively adjustable resistance for varying said time response, said impedance means being connected between said analogue signal voltage-providing means and an input terminal of said amplifier to provide a path for applying the signal voltage produced by said signal voltage-providing means to the input circuit of said amplifier.

3. The weighing system defined in claim 2 wherein said electrical circuit further includes first resistance means connected serially between said analogue signal-providing means and said impedance means to form with said impedance means an electrical, signal-transmitting network, second resistance means providing a feedback connection from the output of said amplifier to said network between said first resistance means and said impedance means and coacting with said first resistance means to determine said gain.

4. the weighing system defined in claim 3 wherein said electrical circuit further comprises first capacitance means providing a further feedback connection from the output of said amplifier to said network between said impedance means and said input of said amplifier and second capacitance means connected between a source of reference potential and the junction between said network and said second resistance means.

5. The weighing system defined in claim 3 wherein said impedance means comprises a potentiometer.

6. In a weighing system having load-supporting means, means operatively connected to said supporting means for providing an analogue signal voltage having an amplitude that is a function of a weight condition of a load applied to said supporting means, signal utilization means, and means interconnecting said analogue signal voltage-providing means and said utilization means and comprising an underdamped electrical multiple pole filter for attenuating undulatory voltages superimposed upon said signal voltage and being responsive to a sudden application of said signal voltage for producing an output voltage having a substantially steady-state value following an initial predetermined overshoot of said steady-state value, said interconnecting means applying said output voltage to said utilization means, and said filter having a damping coefficient which is a function only of a preselected percentage of said overshoot relative to said steady-state value.

7. The weighing system defined in claim 6 wherein said damping coefficient is substantially proportional to the algebraic expression $$\sqrt{\frac{M^2}{\pi^2 + M^2}}$$

wherein $M$ is equal to the natural logarithim of the percentage of overshoot divided by 100 and wherein said percentage of overshoot is equal to the first peak value of said output voltage divided by said steady-state value.

8. In a weighing system having load-supporting means, means operatively connected to said supporting means for producing an analogue signal voltage having an amplitude that is a function of a weight condition of a load applied to said supporting means, signal utilization means, means interconnecting said analogue signal voltage-providing means and said utilization means, an underdamped electrical multiple pole filter forming a part of said interconnecting means for attenuating undulatory voltages superimposed upon said analogue signal voltage and comprising an amplifier having its output connected to said utilization means for applying the output voltage of said filter to said utilization means, an impedance circuit branch having one terminal to which said signal voltage is applied for filtering and a second terminal connected to the input of said amplifier, and means providing a feedback connection from the output of said amplifier to said one terminal, said impedance circuit branch being substantially proportional to the algebraic expression $$\frac{\sqrt{\dfrac{M^2}{\pi^2 + M^2}}}{H + 1}$$

wherein $H$ is equal to the DC gain of said filter, and wherein $M$ is a function only of a preselected percentage by which the output voltage of said filter initially overshoots its steady-state value in response to a sudden application of said analogue signal voltage to said one terminal.

9. In a weighing system having load-supporting means, means operatively connected to said supporting means for providing an analogue signal having an amplitude that is a function of a weight condition of a load applied to said supporting means, signal utilization means, and means interconnecting said analogue signal-providing means and said utilization means and comprising an underdamped multiple pole filter for attenuating undulatory voltages superimposed upon said signal and being responsive to a sudden application of said signal for producing an output signal having a substantially steady state value following an initial predetermined overshoot of said steady state value, said output signal being applied to said utilization means by said interconnecting means, and said filter having a damping coefficient which is a function only of a preselected percentage of said overshoot relative to said steady state value.

10. In a weighing system having means for supporting a load, means operatively connected to said load-supporting means for providing an analogue signal voltage having an amplitude that is a function of a weight condition of a load applied to said supporting means, signal utilization means, and means interconnecting said analogue signal voltage-providing means and said utilization means and comprising an underdamped electrical multiple pole filter circuit for attenuating undulating voltages superimposed on said signal voltage and being responsive to a sudden application of said signal voltage for producing an output voltage having a substantially steady state value following an initial predetermined overshoot of said steady-state value, said output voltage being applied to said utilization means by said interconnecting means, the improvement comprising means forming a part of said circuit for varying the overshoot of said output voltage in response to the sudden application of said signal voltage to said circuit without altering the gain thereof.

11. A weighing system for measuring a weight condition of a load within a preselected tolerance range of the true value of said condition, wherein said range is defined by preselected maximum and minimum weight condition values which are respectively greater than and lesser than said true value, said weighing system comprising a load-supporting means, means operatively connected to said supporting means for providing an analogue signal voltage having an amplitude which represents said weight condition of the load applied to said supporting means, signal utilization means, means interconnecting said analogue signal voltage-providing means and said utilization means for applying said signal voltage to said utilization means and comprising an electrical multiple pole filter for attenuating undulatory voltages superimposed upon said signal voltage, and means forming a part of said filter to provide said filter with a predetermined underdamped response to a step form of said signal voltage which initially overshoots a steady state voltage value corresponding to the amplitude of said signal voltage and which, upon entering the band of voltage values representing said range of weight condition values, remains within said band and has an initial overshoot peak value that at least closely approaches a voltage value representing said maximum weight condition value.

12. A weighing system for measuring a weight condition of a load within a preselected tolerance range of the true value of said condition, wherein said range is defined by preselected maximum and minimum weight condition values which are respectively greater than and lesser than said true value, said weighing system comprising a load-supporting means, means operatively connected to said supporting means for providing an analogue signal having an amplitude which represents said weight condition of the load applied to said supporting means, signal utilization means, means interconnecting said analogue signal-providing means and said utilization means for applying said analogue signal to said utilization means and comprising a filter for attenuating undulatory waveforms superimposed upon said analogue signal, and means forming a part of said filter to provide said filter with an underdamped response to a step form of said analogue voltage which initially overshoots a steady state value corresponding to the amplitude of said analogue signal and which, upon entering the band of values representing said range of weight condition values, remains within said band and has an initial overshoot peak value that at least closely approaches said maximum weight value.

13. In a weighing system having means for supporting a load, means operatively connected to said load-supporting means for producing an analogue signal voltage having an amplitude that is a function of a weight condition of a load applied to said supporting means, signal utilization means, means interconnecting said analogue signal voltage-providing means and said utilization means and comprising an underdamped electrical multiple pole filter circuit for attenuating undulating voltages superimposed on said signal voltage and being responsive to a sudden application of said signal voltage for producing an output voltage having a substantially steady-state value following an initial predetermined overshoot of said steady-state value, said output voltage being applied to said utilization means by said interconnecting means, said filter having a damping coefficient that is a function only of a preselected percentage of said overshoot relative to said steady-state value, and said filter further having a time response that is dependent upon the value of said damping coefficient, and impedance means forming a part of said filter and having a selectively variable resistance for selectively adjusting said damping coefficient without altering the DC gain of said filter.

14. The weighing system defined in claim 13 wherein said weight condition represents any deviation of the weight of the load applied to said supporting structure from a preselected value.

15. The weighing system defined in claim 1 wherein said weight condition represents any deviation of the weight of the load applied to said supporting means from a preselected value.

* * * * *